Patented Oct. 14, 1941

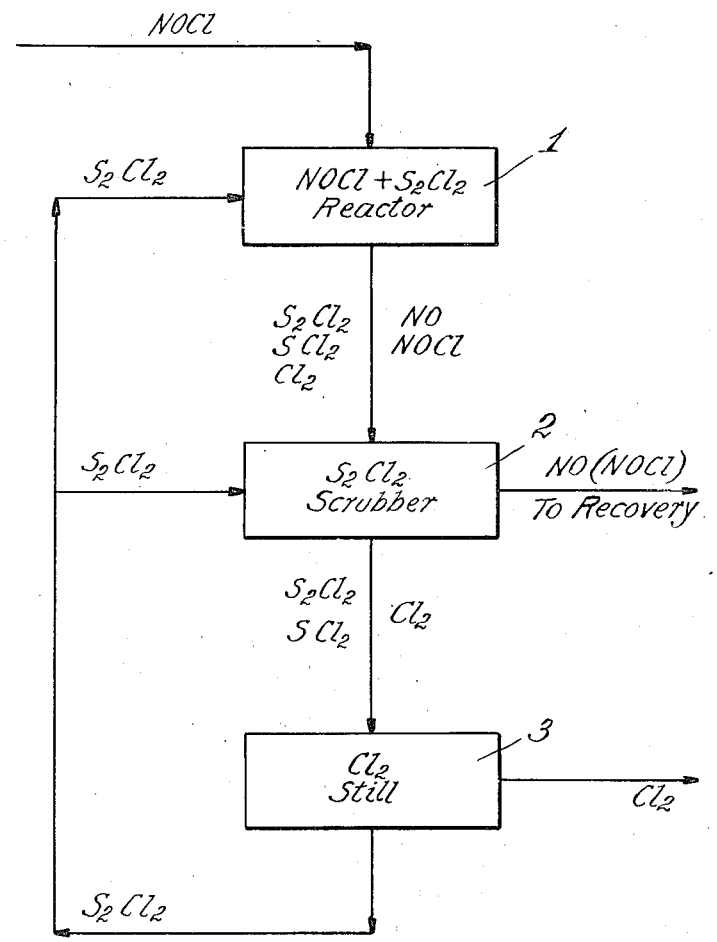

2,258,771

UNITED STATES PATENT OFFICE 2,258,771

PROCESS FOR THE RECOVERY OF CHLORINE FROM NITROSYL CHLORIDE-CONTAINING GASES

William C. Klingelhoefer, Syracuse, N. Y., assignor to The Solvay Process Company, New York, N. Y., a corporation of New York Application November 4, 1938, Serial No. 238,806

6 Claims. (Cl. 23—219)

This invention relates to the recovery of chlorine from nitrosyl chloride-containing gases. More particularly, this invention relates to the recovery of chlorine from nitrosyl chloride-containing gases produced in the manufacture of alkali metal nitrates by the reaction of nitric acid with alkali metal chlorides.

In the process for producing alkali metal nitrates by the reaction of alkali metal chlorides with nitric acid, a gaseous mixture containing approximately equimolecular proportions of chlorine and nitrosyl chloride results; i. e., one-third of the chlorine in the reaction products is in combined form in the nitrosyl chloride. In many cases, it is highly desirable to recover the combined chlorine in nitrosyl chloride as elemental chlorine.

It is the object of this invention to provide a simple and economical method for the recovery of elemental chlorine from nitrosyl chloride.

I have discovered that the combined chlorine in nitrosyl chloride may be advantageously recovered from nitrosyl chloride as elemental chlorine by reacting the nitrosyl chloride with sulfur monochloride to produce a reaction product containing appreciable amounts of sulfur dichloride, and treating the reaction product thus obtained to recover free chlorine therefrom. The residue from the latter treatment, comprising chiefly sulfur monochloride, may be utilized to react with additional quantities of nitrosyl chloride.

The process of my invention may be carried out in a variety of ways. For example, nitrosyl chloride may be reacted with sulfur monochloride, the products of the reaction contacted with liquid sulfur monochloride, and the resultant solution distilled to recover free chlorine. The steps of reacting the nitrosyl chloride with sulfur monochloride and of absorbing the products of the reaction in sulfur monochloride may be combined into one operation by bubbling nitrosyl chloride through liquid sulfur monochloride at temperatures of from 100° to 120° C. in the presence of relatively small amounts of a catalyst such as ferric chloride. Higher percentage conversions of nitrosyl chloride than those obtained by bubbling nitrosyl chloride through sulfur monochloride may be obtained by heating the nitrosyl chloride to temperatures sufficiently high to crack it, partially at least, into nitric oxide and free chlorine, cooling the cracked gas rapidly to avoid recombination of the nitric oxide and chlorine, and then passing the cooled, cracked gas through liquid sulfur monochloride; when operating in this manner the nitrosyl chloride is passed through the cracker at a space velocity between about 100 and about 1000 or more, e. g., a space velocity of about 200, a pressure of about one atmosphere or more, and a temperature between about 100° and about 500° C., preferably between about 400° and about 500° C., and the liquid sulfur monochloride is maintained at a temperature between about 30° and about 50° C. It is also advantageous to add relatively small amounts of catalysts such as antimony trichloride to the sulfur monochloride into which the cracked gases are passed.

I have also found that still higher conversions of nitrosyl chloride may be obtained by contacting the nitrosyl chloride after cracking and cooling with sulfur monochloride solution in a scrubber. When operating in this manner the nitrosyl chloride gas is passed through a cracker at a space velocity between about 100 and about 1000 or more, e. g., a space velocity of about 200, a pressure of about one atmosphere or more, and a temperature between about 100° and about 500° C., preferably between about 400° and about 500° C., and the cracked gases thus obtained are then cooled rapidly to a temperature of about 30° C. The cooled, cracked gases are contacted with liquid sulfur monochloride at a temperature between about 13° and about 65° C., preferably between about 30° and about 50° C., by passing the gas through a scrubber countercurrent to a stream of sulfur monochloride. The sulfur monochloride should preferably contain a relatively small amount of a catalyst to assist the reaction; about 0.01% of antimony trichloride has been found to be suitable. The resulting sulfur monochloride liquor is then withdrawn from the scrubber and distilled to recover free chlorine therefrom.

The process of my invention may also be carried out by passing mixtures of nitrosyl chloride and sulfur monochloride vapors through a vessel maintained at a temperature between about 100° and about 500° C., preferably between about 300° and about 400° C., cooling the resulting gases to condense a liquid sulfur-chloride product, and distilling the condensate to recover free chlorine therefrom. In accordance with this embodiment of my invention, mixtures of nitrosyl chloride and sulfur monochloride vapors having a molal ratio of nitrosyl chloride to sulfur monochloride of from about 0.5 to about 5, preferably between about 0.5 and about 2.0, are passed at a space velocity of from about 100 to about 300 through the heated vessel and the resulting gases then cooled to a temperature between about 20° and about 40° C. to recover a liquid sulfur-chlorine product which may be distilled to recover free chlorine.

The preferred embodiment of the process of my invention involves vaporizing a quantity of sulfur monochloride, mixing the sulfur monochloride vapor with nitrosyl chloride, passing the mixture of vapors through a cracker to cause the nitrosyl chloride to be dissociated, to some extent at least, into nitric oxide and chlorine and also to cause the cracked gases to react with the sulfur monochloride vapors, contacting the resultant product with a flow of liquid sulfur monochloride in a scrubber, and distilling the solution thus produced to recover free chlorine therefrom. The vapor phase reaction of sulfur monochloride and nitrosyl chloride may be carried out under a variety of conditions of temperature, pressure, space velocity, and nitrosyl chloride-sulfur monochloride ratios. Thus, for example, the temperature may vary from about 100° to about 500° C., but preferably the reaction is carried out at about 400° C. A pressure of one atmosphere is preferably used, but pressures above or below one atmosphere may be used if desired, e. g., pressures ranging between about 0.7 and about 10 atmospheres. The space velocity of the mixed nitrosyl chloride and sulfur monochloride vapors passing through the cracker may vary up to 1000 or more; preferably a space velocity of 200 is used. I prefer to use a mixture of nitrosyl chloride and sulfur monochloride containing equimolecular proportions of the two constituents; however, if desired the ratio of nitrosyl chloride to sulfur monochloride may vary between about 0.5 and about 5.0.

The hot gaseous mixture leaving the cracker is then rapidly cooled to a temperature between about 20° and about 40° C. and scrubbed with an amount of liquid sulfur monochloride approximately equal to that mixed with the nitrosyl chloride vapors prior to passage into the cracker. The sulfur monochloride liquid should preferably contain a relatively small amount of a catalyst, e. g., approximately 0.01% of antimony trichloride, to cause substantially all the chlorine contained in the cracked gases to react with the sulfur monochloride. This treatment with the sulfur monochloride is preferably carried out at a pressure of one atmosphere and at a temperature of between about 30° and about 50° C.; however, pressures ranging from about 0.7 to about 10 atmospheres and temperatures of from about 10° to about 100° C. may be used. The sulfur monochloride under these conditions absorbs practically all the chlorine, sulfur monochloride, and sulfur dichloride contained in the product from the cracker; the remaining constituents of the product, namely, nitric oxide and unreacted nitrosyl chloride, are not absorbed in the sulfur monochloride to a substantial extent but leave the scrubber as gases and may be utilized as desired; for example, the nitric oxide may be separated from the nitrosyl chloride and used in the manufacture of nitric acid, the nitrosyl chloride thus recovered being employed in accordance with this invention. Any sulfur monochloride vapors which leave the scrubber in the exit gas may be recovered in any suitable manner, such as, by cooling the gases to condense the sulfur monochloride. While practically all of the uncracked and unreacted nitrosyl chloride passes through the scrubber unabsorbed, a small amount is absorbed by the sulfur monochloride liquor. The nitrosyl chloride thus absorbed is, however, removed before the liquor is removed from the bottom of the scrubber by operating the scrubber in such a manner that a small portion of the liquor is vaporized at the bottom of the scrubber, thus serving to remove substantially all the nitrosyl chloride dissolved in the liquor before its withdrawal from the scrubber.

The liquor withdrawn from the scrubber comprises essentially a mixture of sulfur dichloride and sulfur monochloride containing about 55 atom % chlorine. This mixture is then distilled to produce free chlorine and sulfur monochloride. The distillation may suitably be carried out in a bubble cap tower having from 10 to 30 plates, using a reflux ratio of between 3 and 4. The pressure at which the distillation is carried out may vary between about one and about 10 atmospheres; I prefer to operate at a pressure of about 10 atmospheres. The temperatures at which the boiler of the bubble cap tower and the condenser are maintained will, of course, vary depending upon the pressure at which the distillation is carried out; thus, for example, at a pressure of one atmosphere it is advantageous to conduct the distillation at a temperature of about 138° C. and to maintain the condenser at a temperature of about −35° C. to condense the chlorine evolved; whereas operating under a pressure of 10 atmospheres the distillation may be carried out at a temperature of about 255° C. and the condenser may be maintained at a temperature of about 36° C. By distilling the sulfur monochloride-sulfur dichloride mixture obtained in accordance with my invention in this manner it is possible to obtain a pure chlorine distillate; the residue is essentially sulfur monochloride and may be utilized either to react with additional quantities of nitrosyl chloride in the cracker or to scrub the products of the reaction, as described above.

My invention is also applicable to the treatment of nitrosyl chloride-chlorine mixtures produced in the manufacture of alkali metal nitrates by the reaction of alkali metal chlorides with nitric acid. When treating such mixtures in accordance with my invention, it is most advantageous to contact the mixture with sulfur monochloride to absorb the chlorine in the mixture, and then to treat the unabsorbed nitrosyl chloride in accordance with any one of the above-described methods for recovering chlorine therefrom.

In the accompanying drawing forming a part of this specification, a preferred manner of carrying out the process of my invention is illustrated. As shown in the drawing, nitrosyl chloride and sulfur monochloride vapor are passed into $NOCl + S_2Cl_2$ reactor 1. In reactor 1 the gases are heated to a temperature of about 400° C. at a pressure of about one atmosphere, whereby a gaseous product comprising sulfur monochloride, sulfur dichloride, chlorine, nitric oxide, and nitrosyl chloride is produced and withdrawn from reactor 1. This gaseous product is then cooled to a temperature between about 20° and about 40° C. and passed to $S_2Cl_2$ scrubber 2, wherein it is contacted countercurrently with a flow of liquid sulfur monochloride containing about 0.01% antimony trichloride at a pressure of about one atmosphere and at a temperature between about 30° and about 50° C. Substantially all the sulfur monochloride, sulfur dichloride, and chlorine contained in the product from reactor 1 is absorbed in the liquid sulfur monochloride in scrubber 2, the nitric oxide and substantially all the nitrosyl chloride passing through scrubber 2 unabsorbed. Scrubber 2 is provided at its base with means to heat the sulfur-chlorine product liquor to remove any nitrosyl chloride dissolved therein so that a sulfur-chlorine product substantially free of nitric oxide and nitrosyl chloride is withdrawn from scrubber 2. This liquor is then passed to Cl₂ still 3, wherein the liquor is distilled at a pressure of from about one to about 10 atmospheres to recover a substantially pure chlorine distillate. The residue from this distillation consists chiefly of sulfur monochloride and is returned either to reactor 1 or scrubber 2.

The apparatus in which the process of my invention is practiced should be constructed of material which resists the corrosive action of various compounds with which it comes in contact. Apparatus in which sulfur chlorides are to be treated should be constructed either of nickel or of "Dow metal" (a magnesium alloy); where the apparatus is merely subjected to the corrosive action of chlorine, steel is suitable as a construction material.

The following examples are illustrative of the process of my invention.

*Example 1.*—Equimolecular amounts of nitrosyl chloride and sulfur monochloride vapors were mixed, preheated to a temperature of about 300° C. by indirect contact with hot gases obtained as described hereinbelow, and passed at a space velocity of about 200 through a container maintained at a temperature of about 400° C. and a pressure of about one atmosphere. The hot gases leaving the container were used to preheat the gases entering the container, as described above, and were then cooled rapidly to a temperature of about 30° C. The resultant product was then introduced directly into a scrubber and passed up through the scrubber at a pressure of about one atmosphere and at a temperature of about 30° C. countercurrent to a downwardly descending stream of liquid sulfur monochloride containing about 0.01% antimony trichloride, about one mol of liquid sulfur monochloride being introduced into the scrubber, exclusive of that from the cracker, per mol of nitrosyl chloride fed to the cracker. The sulfur monochloride liquor absorbed practically all the sulfur monochloride, chlorine, and sulfur dichloride contained in the product from the cracker, whereas the nitric oxide and unreacted nitrosyl chloride remained unabsorbed and were withdrawn at the top of the scrubber. The sulfur-chlorine product was subjected at the base of the scrubber to a temperature of about 90° C. in order to evaporate the small amount of nitrosyl chloride present in said liquor before its removal from the scrubber. This liquor, which contained about 55 atom % chlorine, was then transferred to a bubble cap tower having 20 plates. In this tower the sulfur-chlorine product from the scrubber was distilled at a pressure of about 10 atmospheres and a temperature of about 255° C., employing a reflux ratio of about 3.5, whereby substantially pure chlorine was recovered in a condenser at the top of the tower maintained at a temperature of about 36° C. The residue from this distillation was divided, part thereof being returned for reaction with additional quantities of nitrosyl chloride and the remainder being utilized in the scrubber, as described above.

*Example 2.*—Nitrosyl chloride was passed at a space velocity of about 200 through a container maintained at a temperature of about 400° C. and a pressure of about one atmosphere. The hot gases leaving the container were cooled rapidly to a temperature of about 30° C. and were then passed into a scrubber wherein the gas was contacted at a pressure of about one atmosphere and a temperature of about 30° C. countercurrently with a downwardly descending flow of liquid sulfur monochloride containing about 0.01% antimony trichloride, about one mol of sulfur monochloride being introduced into the scrubber per mol of nitrosyl chloride fed to the cracker. The cracked gas reacted with the sulfur monochloride to produce a liquor containing about 57 atom % chlorine and a gas which was withdrawn at the top of the scrubber comprising nitric oxide and unreacted nitrosyl chloride. The sulfur monochloride liquor containing the dissolved gases was subjected at the base of the scrubber to a temperature of about 80° C. to evaporate any nitrosyl chloride dissolved therein. This liquor was then withdrawn from the scrubber, passed to a bubble cap tower having 20 plates, and distilled at a pressure of about 10 atmospheres and a temperature of about 255° C., employing a reflux radio of about 3.3. Substantially pure chlorine was recovered in a condenser at the top of the tower maintained at a temperature of about 36° C. The residue which consisted chiefly of sulfur monochloride was utilized to react with additional quantities of nitrosyl chloride, as described above.

It is seen from the above description that by the process of my invention chlorine may be recovered from nitrosyl chloride as elemental chlorine in a simple and economical manner. This invention is of considerable value in the manufacture of alkali metal nitrates by the reaction of alkali metal chlorides with nitric acid for, by operating in accordance with my invention, practically all of the combined chlorine which is converted to nitrosyl chloride in the manufacture of the alkali metal nitrates may be recovered as elemental chlorine and sold as such.

I claim:

1. In a process for the recovery of elemental chlorine from nitrosyl chloride-containing gases, the steps which comprise mixing sulfur monochloride vapors with an approximately equimolecular amount of nitrosyl chloride, passing the mixture of vapors through a container heated to between about 100° and about 500° C. to form a reaction product having a higher chlorine content than the sulfur monochloride and comprising sulfur dichloride, cooling the hot reaction product leaving the container rapidly to a temperature between about 20° and about 40° C., contacting the reaction product containing nitric oxide, chlorine and sulfur dichloride, with liquid sulfur monochloride, to effect reaction between chlorine in said reaction product and the liquid sulfur monochloride, and distilling the solution thus obtained to recover elemental chlorine.

2. In a process for the recovery of elemental chlorine from nitrosyl chloride, the steps which comprise mixing sulfur monochloride vapors with an approximately equimolecular amount of nitrosyl chloride, passing the mixture of vapors through a container heated to between about 100° and about 500° C. at a pressure between about 0.7 and about 10 atmospheres to form a reaction product having a higher chlorine content than the sulfur monochloride and comprising sulfur dichloride, cooling the hot reaction product leaving the container rapidly to a temperature between about 20° and about 40° C., contacting the reaction product containing nitric oxide, chlorine and sulfur dichloride, with liquid sulfur monochloride, to effect reaction between chlorine in said reaction product and the liquid sulfur monochloride, and distilling the solution thus obtained to recover elemental chlorine.

3. In a process for the recovery of elemental chlorine from nitrosyl chloride, the steps which comprise mixing sulfur monochloride vapors with an approximately equimolecular amount of nitrosyl chloride, passing the mixture of vapors through a container heated to between about 100° and about 500° C. at a space velocity of between about 10 and about 1000 to form a reaction product having a higher chlorine content than the sulfur monochloride and comprising sulfur dichloride, cooling the hot reaction product leaving the container rapidly to a temperature between about 20° and about 40° C., contacting the reaction product containing nitric oxide, chlorine and sulfur dichloride, with liquid sulfur monochloride, to effect reaction between chlorine in said reaction product and the liquid sulfur monochloride, and distilling the solution thus obtained to recover elemental chlorine.

4. In a process for the recovery of elemental chlorine from nitrosyl chloride, the steps which comprise mixing sulfur monochloride vapors with an approximately equimolecular amount of nitrosyl chloride, passing the mixture of vapors through a container heated to about 400° C. at a pressure of about one atmosphere and a space velocity of about 200 to form a reaction product having a higher chlorine content than the sulfur monochloride and comprising sulfur dichloride, cooling the hot reaction product leaving the container rapidly to a temperature between about 20° and about 40° C., contacting the reaction product containing nitric oxide, chlorine and sulfur dichloride, with liquid sulfur monochloride containing about 0.01% antimony trichloride, to effect reaction between chlorine in said reaction product and the liquid sulfur monochloride, withdrawing nitric oxide and unreacted nitrosyl chloride from the vessel in which the cooled reaction product is contacted with sulfur monochloride, and distilling the solution thus obtained at a pressure of about 10 atmospheres to recover elemental chlorine.

5. In a process for the recovery of elemental chlorine from nitrosyl chloride containing gases, the steps which comprise heating a mixture of nitrosyl chloride and sulfur monochloride vapor at a temperature in the range about 100° to 500° C., cooling the hot reaction product rapidly, contacting the cooled reaction product containing nitric oxide, chlorine and sulfur dichloride with liquid sulfur monochloride at a temperature between about 10° and about 100° C. to effect reaction between chlorine in said reaction product and the liquid sulfur monochloride, and distilling the solution thus obtained to recover elemental chlorine.

6. In a process for the recovery of elemental chlorine from nitrosyl chloride containing gases, the step which comprises contacting a mixture of nitric oxide, chlorine, sulfur dichloride, nitrosyl chloride and sulfur monochloride with liquid sulfur monochloride in the presence of antimony trichloride at a temperature between about 10° and about 100° C. to effect reaction between chlorine and liquid sulfur monochloride.

WILLIAM C. KLINGELHOEFER.